United States Patent
Woo et al.

(10) Patent No.: US 10,510,461 B2
(45) Date of Patent: Dec. 17, 2019

(54) CONDUCTIVE FILM AND PRODUCTION METHOD THEREOF

(71) Applicant: LG Chem, Ltd., Seoul (KR)

(72) Inventors: Dong Hyun Woo, Daejeon (KR); Se Woo Yang, Daejeon (KR); Min Soo Park, Daejeon (KR); Ji Young Hwang, Daejeon (KR)

(73) Assignee: LG Chem, Ltd. (KR)

( * ) Notice: Subject to any disclaimer, the term of this patent is extended or adjusted under 35 U.S.C. 154(b) by 49 days.

(21) Appl. No.: 14/911,612

(22) PCT Filed: Aug. 18, 2014

(86) PCT No.: PCT/KR2014/007628
§ 371 (c)(1),
(2) Date: Feb. 11, 2016

(87) PCT Pub. No.: WO2015/023161
PCT Pub. Date: Feb. 19, 2015

(65) Prior Publication Data
US 2016/0189825 A1    Jun. 30, 2016

(30) Foreign Application Priority Data

Aug. 16, 2013 (KR) .................. 10-2013-0097222
Aug. 16, 2013 (KR) .................. 10-2013-0097223
Aug. 16, 2013 (KR) .................. 10-2013-0097224

(51) Int. Cl.
*H01B 5/14* (2006.01)
*B32B 7/12* (2006.01)
*H01B 13/00* (2006.01)

(52) U.S. Cl.
CPC ................ *H01B 5/14* (2013.01); *B32B 7/12* (2013.01); *H01B 13/0026* (2013.01); *B32B 2307/202* (2013.01)

(58) Field of Classification Search
CPC ......... H01B 5/14; B32B 37/12; B32B 38/164; B32B 38/168; B32B 2307/202; C09J 7/38;
(Continued)

(56) References Cited

U.S. PATENT DOCUMENTS 5,240,761 A * 8/1993 Calhoun .................. C09J 7/00
                                                        428/148
9,696,574 B2 * 7/2017 Tanabe ...................... B32B 7/02
(Continued)

FOREIGN PATENT DOCUMENTS

CN     102648260 A    8/2012
JP     2000115420 A   4/2000
(Continued)

OTHER PUBLICATIONS

Machine translation of KR 10-2012-0056175 date unknown.*
(Continued)

*Primary Examiner* — John L Goff, II
(74) *Attorney, Agent, or Firm* — Lerner, David, Littenberg, Krumholz & Mentlik, LLP (57) ABSTRACT

The present application relates to a conductive film, a production method for the same, and a use of the same. The present application is capable of providing, for example, a conductive film without air bubbles, etc. which are generated by heat treatment, etc. during a production process, and inhibit optical physical properties. In particular, the present application can provide a conductive film without generation of air bubbles even in a structure in which the conductive layers exist on both sides of the conductive film.

7 Claims, 3 Drawing Sheets

(58) Field of Classification Search
CPC ... C09J 7/381; C09J 7/383; C09J 7/385; C09J 7/387
See application file for complete search history.

(56) References Cited

U.S. PATENT DOCUMENTS

| | | |
|---|---|---|
| 2010/0143634 A1 | 6/2010 | Yasui et al. |
| 2011/0291968 A1 | 12/2011 | Kawazoe et al. |
| 2012/0157611 A1 | 6/2012 | Katami et al. |
| 2012/0251821 A1* | 10/2012 | Hosokawa ....... B29D 11/00788 428/355 AC |
| 2014/0057102 A1 | 2/2014 | Park et al. |
| 2014/0078422 A1 | 3/2014 | Tanabe et al. |
| 2014/0134434 A1 | 5/2014 | Park et al. |
| 2015/0093542 A1 | 4/2015 | Matsumoto et al. |

FOREIGN PATENT DOCUMENTS

| | | | |
|---|---|---|---|
| JP | 2010066836 A | 3/2010 | |
| JP | 2010215794 A | 9/2010 | |
| JP | 2012-061683 A | 3/2012 | |
| JP | 2012140605 A | 7/2012 | |
| JP | 2012238467 A | 12/2012 | |
| JP | 2013100485 A | 5/2013 | |
| JP | 2013131151 A | 7/2013 | |
| KR | 10-2011-0130346 A | 12/2011 | |
| KR | 10-2012-0044013 A | 5/2012 | |
| KR | 10-2012-0056175 A | 6/2012 | |
| KR | 10-2013-0010869 A | 1/2013 | |
| WO | 2010001855 A1 | 1/2010 | |
| WO | WO-2011112508 A1 * | 9/2011 | ............ C09J 7/0246 |
| WO | 2012132115 A1 | 10/2012 | |
| WO | 2012153677 A1 | 11/2012 | |
| WO | 2012173247 A1 | 12/2012 | |
| WO | 2013094542 A1 | 6/2013 | |

OTHER PUBLICATIONS

Machine translation of JP 2012-061683 date unknown.*
Office Action from Chinese Application No. 2014800573779, dated Oct. 10, 2016.
Extended Search Report from European Application No. 14836422.7, dated Dec. 23, 2016.
Database WPI, Week 201346, Thomson Scientific, London, GB; AN 2013-L44736, XP002765238.
Database WPI, Week 201278, Thomson Scientific, London, GB; AN 2012-P93413, XP002765239.
Database WPI, Week 201281, Thomson Scientific, London, GB; AN 2012-G76841, XP002765240.
International Search Report for Application No. PCT/KR2014/007628 dated Nov. 20, 2014.

* cited by examiner

CONDUCTIVE FILM AND PRODUCTION METHOD THEREOF

CROSS-REFERENCE TO RELATED APPLICATION

This application is a national phase entry under 35 U.S.C. § 371 of International Application No. PCT/KR2014/007628, filed Aug. 18, 2014, which claims priority to Korean Patent Application No. 2013-0097222, filed on Aug. 16, 2013, Korean Patent Application No. 2013-0097223, filed on Aug. 16, 2013, and Korean Patent Application No. 2013-0097224, filed on Aug. 16, 2013, the disclosures of which are incorporated herein by reference.

TECHNICAL FIELD

The present application relates to a conductive film, a use thereof, and a method of manufacturing the same.

BACKGROUND ART

A conductive film represented by an indium tin oxide (ITO) film is being used in various applications, for example, an electrode for a display device such as a plasma display panel (PDP) or a liquid crystal display (LCD), or an organic light emitting diode (OLED), and an electrode for a touch panel.

The conductive film may be manufactured by forming a conductive layer like ITO on one or both sides of a glass substrate or plastic film by a method such as deposition and the like.

In order to crystallize the conductive layer such as ITO in the manufacturing of the conductive film, a thermal treatment may be performed at a high temperature. Particularly, when the conductive layer is formed on a plastic film, and the thermal treatment is performed at a high temperature, due to the influence of a low molecular weight component such as an oligomer existing in the plastic film, bubbles may be generated in the conductive film, and such bubbles become a cause of degrading an optical property of the conductive film such as transparency. Particularly, when the conductive layers are formed on both sides of the film, they serve as a barrier to the bubbles, and therefore it is more difficult to remove the bubbles generated therein.

DETAILED DESCRIPTION OF THE INVENTION

Technical Problem

The present application is directed to providing a method of manufacturing a conductive film, a conductive film, and a use thereof.

Means for Solving the Problem

One aspect of the present application provides a conductive film, which includes: an intermediate base layer; and a conductive base layer attached to one or both sides of the intermediate base layer. The conductive base layer is attached to have a room temperature peel strength of 1000 gf/inch or more with respect to the intermediate base layer, which is measured at a peeling rate of 0.3 m/min and a peeling angle of 180 degrees.

Another aspect of the present application provides a method of manufacturing a conductive film, which includes attaching a conductive base layer to one or both sides of an intermediate base layer to have a room temperature peel strength of 1000 gf/inch or more with respect to the intermediate base layer, which is measured at a peeling rate of 0.3 m/min and a peeling angle of 180 degrees.

Still another aspect of the present application provides a use of the conductive film.

Effects of the Invention

According to the present application, a conductive film, which does not have bubbles generated by thermal treatment in a manufacturing process, and thus an optical property is degraded, can be provided. Particularly, a conductive film that does not have bubbles even with conductive layers formed on both sides thereof, a use thereof, and a method of manufacturing the same can be provided.

Also, in the present application, a conductive film including a conductive base layer having an excellent peel strength with respect to an intermediate base layer, a use of the conductive film, and a method of manufacturing the same can be provided.

BRIEF DESCRIPTION OF THE INVENTION

DESCRIPTION OF SYMBOLS

11: Intermediate base layer
12a: Layer of pressure-sensitive adhesive composition
12b: Pressure-sensitive adhesive layer
13: Conductive base layer
13a: Base layer
13b: Conductive layer
14: Release film

Modes of the Invention

The present application relates to a conductive film, a method of manufacturing a conductive film, and a use of a conductive film.

Bubbles that may be generated in thermal treatment of the conductive film become a cause of degrading an optical property of the conductive film, for example, transparency, and the bubbles may be generated by degrading a peel strength between an intermediate base layer and a conductive base layer. Accordingly, to prevent the bubbles that can be generated in the conductive film, a process of increasing the peel strength between the intermediate base layer and the conductive base layer is needed.

The present application may provide a conductive film having an excellent peel strength with respect to an intermediate base layer of a conductive base layer by forming a layer of a pressure-sensitive adhesive composition on one or both sides of the intermediate base layer, and inducing crosslinking reaction in the layer of the pressure-sensitive adhesive composition before or after the conductive base layer is attached.

In order to form the layer of the pressure-sensitive adhesive composition, a pressure-sensitive adhesive composition may be directly applied to the intermediate base layer, or a film-type layer of the pressure-sensitive adhesive composition may be laminated. That is, the layer of the pressure-sensitive adhesive composition may refer to a layer formed by directly applying the pressure-sensitive adhesive composition to the intermediate base layer, or a film-type layer formed of the pressure-sensitive adhesive composition, which is stacked on the intermediate base layer.

The term "pressure-sensitive adhesive composition" used herein may refer to a composition that is not crosslinked, and the term "pressure-sensitive adhesive" used herein may refer to a state in which the pressure-sensitive adhesive composition is crosslinked. Accordingly, the term "layer of a pressure-sensitive adhesive composition" used herein may refer to a layer of an uncrosslinked pressure-sensitive adhesive composition, which is formed on the intermediate base layer, and the term "pressure-sensitive adhesive layer" used herein may refer to a layer of a crosslinked pressure-sensitive adhesive composition, which is formed on the intermediate base layer. It can be understood that the "crosslinked state" means a state in which crosslinking is going on, as well as a state in which the crosslinking has been done.

As the conductive film of the present application is manufactured by the above-described process, the conductive base layer may be attached to have a high peel strength with respect to the intermediate base layer, and therefore, bubbles may not be generated in the conductive film, for example, at the interface between the conductive base layer and the intermediate base layer, and lifting or delamination at the interface may also be prevented.

Namely, the present application relates to a method of manufacturing a conducive film, which includes attaching a conductive base layer on one or both sides of the intermediate base layer to have a room temperature peel strength of 1000 gf/inch or more with respect to the intermediate base layer, which is measured at a peeling rate of 0.3 m/min and a peeling angle of 180 degrees. The term "room temperature" used herein may refer to a temperature in its natural state, which is not forced to be increased or decreased, for example, a temperature ranging from approximately 20 to 30° C., approximately 20 to 28° C., approximately 25° C., or approximately 23° C.

The conductive base layer of the present application may be attached by means of a layer of a pressure-sensitive adhesive composition provided on one or both sides of the intermediate base layer, and a room temperature peel strength with respect to the intermediate base layer, which is measured at a peeling rate of 0.3 m/min and a peeling angle of 180 degrees, may be 1,000 to 5,000 gf/inch or 1,000 to 10,000 gf/inch. When the peel strength of the conductive base layer is maintained within this range, degradation in an optical property due to bubbles generated in the conductive base layer may be prevented.

The layer of the pressure-sensitive adhesive composition may be formed by directly applying a pressure-sensitive adhesive composition to the intermediate base layer, or laminating the film-type layer of the pressure-sensitive adhesive composition on one or both sides of the intermediate base layer.

In other words, the method of manufacturing a conductive film of the present application may include applying an uncrosslinked pressure-sensitive adhesive composition to one or both sides of the intermediate base layer, and attaching a conductive base layer to the intermediate base layer by means of the layer of the applied pressure-sensitive adhesive composition.

Figure 1:
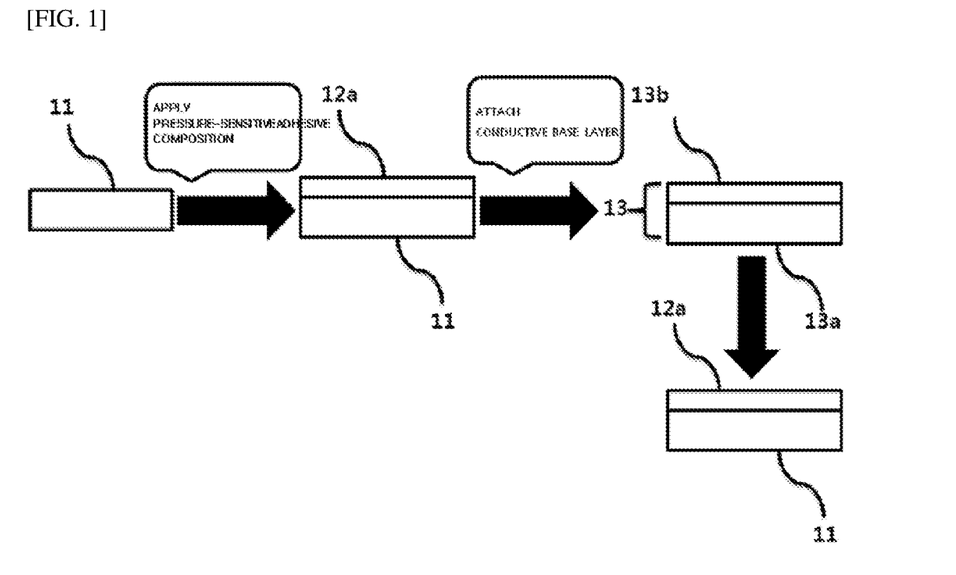
FIGS. 1 and 2 are schematic diagrams illustrating a process of manufacturing a transparent conductive film by attaching a conductive base layer before a layer of a pressure-sensitive adhesive composition of the present application is crosslinked.

As an example, as illustrated in FIG. 1, the conductive film of the present application may be manufactured by a process of forming a layer of a pressure-sensitive adhesive composition 12a on one side of an intermediate base layer 11, and attaching a conductive base layer 13.

The conductive base layer 13 may include, as shown in FIG. 1, an intermediate base layer 13a, and a conductive layer 13b formed on one side of the base layer 13a, and here, a surface of the base layer 13a on which the conductive layer 13b is not formed may be attached to the intermediate base layer 11 by means of the layer of the pressure-sensitive adhesive composition 12a.

Figure 2:
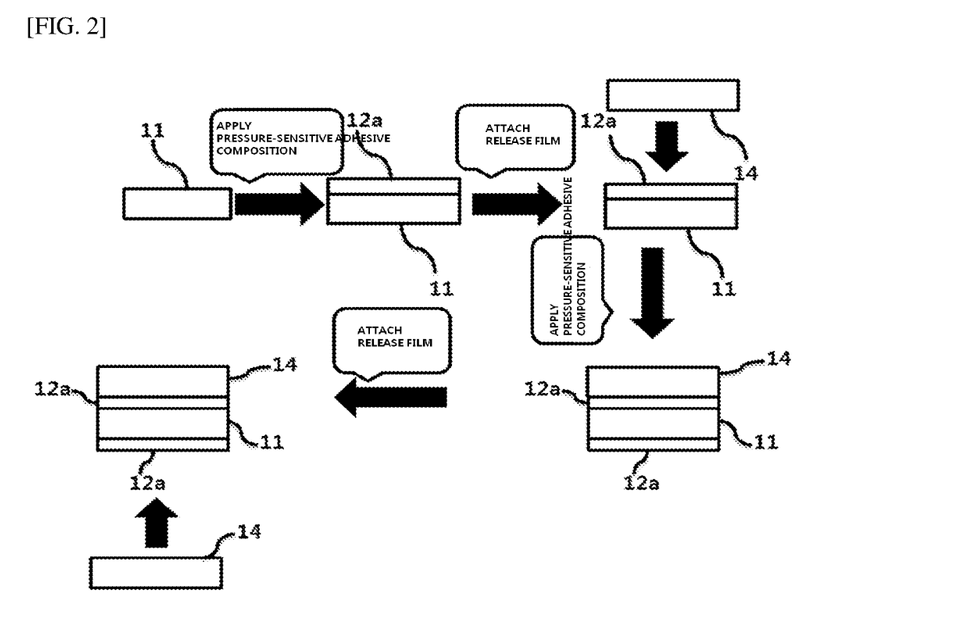

In addition, as illustrate in FIG. 2, the conductive film of the present application may be manufactured by a process of forming layers of pressure-sensitive adhesive composition 12a on both sides of an intermediate base layer 11, and attaching conductive base layers 13 to both sides of the intermediate base layer 11 by means of the layer of the pressure-sensitive adhesive composition 12a.

In the process of manufacturing a conductive film including conductive base layers on both sides of the intermediate base layer, the conductive base layers may be sequentially or simultaneously formed on both sides of the intermediate base layer. That is, the process of forming the layers of pressure-sensitive adhesive composition 12a on both sides of the intermediate base layer as shown in FIG. 2 may be performed by forming the layer 12a by applying a pressure-sensitive adhesive composition on one side of the intermediate base layer 11, stacking a release film 14 on the layer 12a, forming a layer 12a again by applying a pressure-sensitive adhesive composition on the other side of the intermediate base layer 11, and stacking a release film 14 on the layer 12a again. Afterward, after the release films 14 are sequentially or simultaneously detached, the conductive base layer 13 may be stacked on the intermediate base layer 11 by means of the layer of the pressure-sensitive adhesive composition 12a as shown in FIG. 1. Alternatively, the conductive film may be manufactured by a process of sequentially stacking a layer of a pressure-sensitive adhesive composition and a conductive base layer on one side of an intermediate base layer, and sequentially stacking a layer of a pressure-sensitive adhesive composition and a conductive base layer on the other side of the intermediate base layer.

The conductive base layer may be attached in the state in which the layer of the pressure-sensitive adhesive composition is not crosslinked, or may be attached in the state in which a pressure-sensitive adhesive layer is formed after or during crosslinking performed on the layer. That is, before or after the conductive base layer is attached, crosslinking of the layer of the pressure-sensitive adhesive composition may be further performed.

Figure 3:
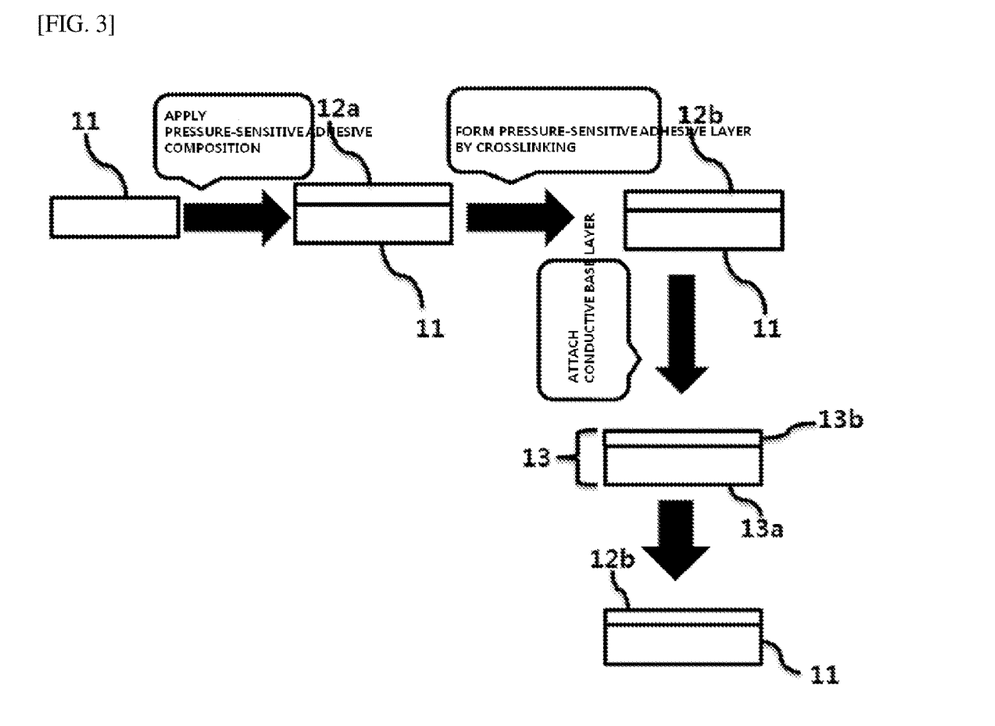
FIG. 3 is a schematic diagram illustrating a process of manufacturing a transparent conductive film by attaching a conductive base layer after a pressure-sensitive adhesive layer is formed by crosslinking a layer of a pressure-sensitive adhesive composition of the present application.
Figure 4:
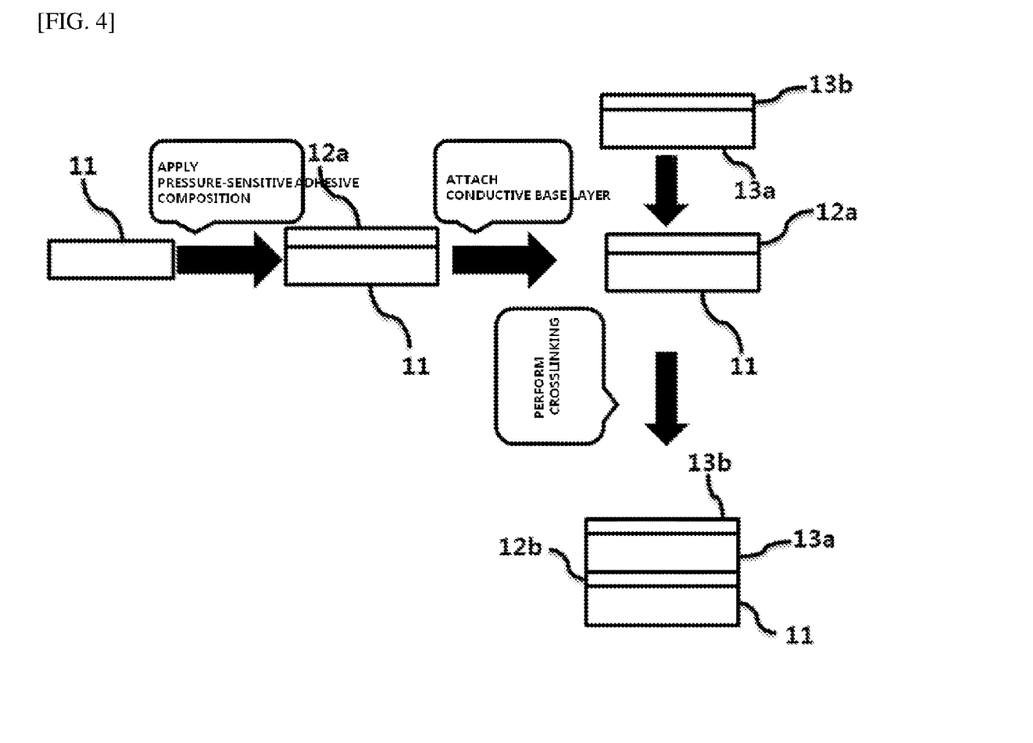
FIG. 4 is a schematic diagram illustrating a process of manufacturing a transparent conductive film, which is manufactured by attaching a conductive base layer before a layer of a pressure-sensitive adhesive composition of the present application is crosslinked and performing crosslinking.

To be specific, as illustrated in FIG. 3, the conductive film of the present application may be manufactured by a process of attaching a conductive base layer 13 to a pressure-sensitive adhesive layer 12b formed by inducing crosslinking on a layer of a pressure-sensitive adhesive composition before the conductive base layer is attached. Alternatively, as illustrated in FIG. 4, the conductive film of the present application may be manufactured by a process of attaching a conductive base layer, and inducing crosslinking on a layer of a pressure-sensitive adhesive composition.

The intermediate base layer on which the layer of the pressure-sensitive adhesive composition of the present application can be formed may be formed of a known material without particular limitation. For example, as the intermediate base layer, a variety of plastic films including a polyester-based film such as a polyethyleneterephthalate film, a polyethylenenaphthalate film or a polybutyleneterephthalate film; a polyether sulfone-based film; a polyamide-based film; a polyimide-based film; a polyolefin-based film; a (meth)acrylate-based film; a polyvinylchloride-based film; a polystyrene-based film; a polyvinylalcohol-based film; a polyarylate-based film; and a poly(phenylene sulfide)-based film may be used. The plastic films may be non-oriented films or oriented films such as a uniaxially or biaxially oriented film. Surface treatment such as corona discharging, UV irradiation, or plasma or sputter etching may be performed on one or both sides of the intermediate base layer, or a surface treatment layer such as a hard coating layer or blocking prevention layer may be formed thereon. The surface treatment or the surface treatment layer may be performed or formed using a known method or material, and the present application is not particularly limited to a specific treatment method or material. The thickness of the intermediate base layer is not particularly limited, either, and the intermediate base layer may be formed to a suitable thickness by taking a desired use into consideration.

In the present application, as an example of the process of forming the pressure-sensitive adhesive composition on one or both sides of the intermediate base layer, the layer of the pressure-sensitive adhesive composition may be formed by directly applying the pressure-sensitive adhesive composition. Here, the direct application may refer to the state in which an uncrosslinked pressure-sensitive adhesive composition is applied as it is to the intermediate base layer, or is applied thereto after being diluted with a suitable solvent, resulting in a coating solution.

The pressure-sensitive adhesive composition may be applied by a conventional coating method, for example, bar coating, blade coating or spin coating without particular limitation. The pressure-sensitive adhesive composition may be directly applied to the surface of the intermediate base layer, and when the above-described surface treatment layer is present on the intermediate base layer, the pressure-sensitive adhesive composition may be applied to the surface of the surface treatment layer.

As the pressure-sensitive adhesive composition, a conventional pressure-sensitive adhesive composition may be used. For example, as the pressure-sensitive adhesive composition, an acrylic pressure-sensitive adhesive composition, a silicone pressure-sensitive adhesive composition, a rubber pressure-sensitive adhesive composition or a polyester pressure-sensitive adhesive composition may be used. Generally, an acrylic pressure-sensitive adhesive composition may be used.

The acrylic pressure-sensitive adhesive composition may include, for example, an acrylic polymer, and the acrylic polymer may be a pressure-sensitive adhesive polymer. The acrylic polymer may include, for example, a polymerized unit derived from a compound of Formula 1 and a polymerized unit derived from a monomer containing a crosslinkable functional group. The term "polymerized unit derived from the monomer" used herein may refer to a monomer included in a backbone of a side chain or main chain of a polymer prepared by polymerizing the monomer.

[Formula 1]

In Formula 1, $R^1$ is hydrogen or an alkyl group having 1 to 4 carbon atoms, or $R^2$ is a linear or branched alkyl group having 2 or more carbon atoms.

Here, the alkyl group of $R^2$ may be, for example, a linear or branched alkyl group having 2 to 20, 2 to 14 or 2 to 10 carbon atoms.

Various types of the compound of Formula 1 which may be used to prepare the pressure-sensitive adhesive acrylic polymer may be known. For example, as the compound of Formula 1, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl(meth)acrylate, isobornyl (meth)acrylate or lauryl (meth)acrylate may be used. One or two or more of the above-described compounds may be polymerized, thereby forming a polymerized unit of the polymer.

The acrylic polymer may also include a polymerized unit derived from a monomer containing a crosslinkable functional group. The term "monomer containing a crosslinkable functional group" may refer to a monomer having both of a functional group that can be copolymerized with a compound forming an acrylic polymer such as the compound of Formula 1 and a crosslinkable functional group. Such a monomer may be polymerized, thereby providing a crosslinkable functional group to the acrylic polymer. As the crosslinkable functional group, for example, a hydroxyl group, a carboxyl group, an epoxy group, an amine group, a glycidyl group or an isocyanate group may be used, and a variety of monomers that can provide the above-described crosslinkable functional group are known in the field of preparing a pressure-sensitive adhesive.

For example, a monomer having a hydroxyl group may be, but is not limited to, hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate, or hydroxypolyalkyleneglycol (meth)acrylate such as hydroxypolyethyleneglycol (meth)acrylate or hydroxypoly propyleneglycol (meth)acrylate.

Also, a monomer having a carboxyl group may be, but is not limited to, (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, or maleic acid anhydride.

An example of a monomer having an amine group of the present application may be, but is not limited to, 2-aminoethyl (meth)acrylate, 3-aminopropyl (meth)acrylate, N,N-dimethylaminoethyl (meth)acrylate, or N,N-dimethylaminopropyl (meth)acrylate.

The acrylic polymer may include, for example, a polymerized unit derived from 80 to 99.9 parts by weight of the compound of Formula 1 and a polymerized unit derived from 0.1 to 10 parts by weight of the monomer containing a crosslinkable functional group. The term "parts by weight" used herein refers to, unless particularly defined otherwise, a weight ratio between components. Accordingly, the sentence "the polymer includes the polymerized unit derived from 80 to 99.9 parts by weight of the compound of Formula 1 and the polymerized unit derived from 0.1 to 10 parts by weight of the monomer containing a crosslinkable functional group" may represent that the polymer is prepared from a monomer mixture of the compound of Formula 1 and the monomer containing a crosslinkable functional group such that a ratio (A:B) of the weight (A) of the compound of Formula 1 to the weight (B) of the monomer containing a crosslinkable functional group is, for example, 80 to 99.9: 0.1 to 10. The ratio of the monomer constituting the acrylic polymer may be adjusted as described above, thereby preparing a polymer having a suitable pressure-sensitive adhesive property and ensuring a suitable cohesive force in crosslinking.

The acrylic polymer may also include a polymerized unit derived from a different monomer, in addition to the above-described polymerized units. Such a monomer may include at least one selected from the group consisting of (meth) acrylic acid esters having an alicyclic structure, for example, isobornyl acrylate, cyclohexyl acrylate, dicyclopentanyl acrylate, cyclododecyl acrylate, methylcyclohexyl acrylate, trimethylcyclohexyl acrylate, tert-butylcyclohexyl acrylate, cyclohexyl α-ethoxy acrylate, and cyclohexylphenyl acrylate. The term "alicyclic structure" used herein may refer to a cycloparaffin structure conventionally having 5 or more, or approximately 5 to 7 carbon atoms.

When the polymerized unit derived from such a monomer is additionally included, bubbles generated at a high temperature may be more effectively inhibited, a conversion rate may be suitably maintained in the preparation of the polymer, and a molecular weight may also be effectively controlled. The acrylic polymer may further include, for example, a polymerized unit derived from 5 to 40 parts by weight of the methyl (meth)acrylate and/or 5 to 30 parts by weight of the (meth)acrylate having an alicylic side chain.

The acrylic polymer may further include another arbitrary comonomer when necessary, and such a comonomer may be, but is not limited to, a nitrogen-containing monomer such as (meth)acrylonitrile, (meth)acrylamide, N-methyl (meth)acrylamide, N,N-dimethyl (meth)acrylamide, N-butoxy methyl (meth)acrylamide, N-vinyl pyrrolidone or N-vinylcaprolactam; an alkyleneoxide group-containing monomer such as alkoxy alkyleneglycol (meth)acrylic acid ester, alkoxy dialkyleneglycol (meth)acrylic acid ester, alkoxy trialkyleneglycol (meth)acrylic acid ester, alkoxy tetraalkyleneglycol (meth)acrylic acid ester, alkoxy polyethyleneglycol (meth)acrylic acid ester, phenoxy alkyleneglycol (meth) acrylic acid ester, phenoxy dialkyleneglycol (meth)acrylic acid ester, phenoxy trialkyleneglycol (meth)acrylic acid ester, phenoxy tetraalkyleneglycol (meth)acrylic acid ester or phenoxy polyalkyleneglycol (meth)acrylic acid ester; a styrene-based monomer such as styrene or methyl styrene; a glycidyl group-containing monomer such as glycidyl (meth) acrylate; or carboxylic acid vinyl ester such as vinyl acetate.

The acrylic polymer may be prepared by a conventional polymerization method. For example, the acrylic polymer may be prepared by applying a monomer mixture prepared by applying necessary monomers according to the composition of a desired monomer to a polymerization method such as solution polymerization, photo polymerization, bulk polymerization, suspension polymerization or emulsion polymerization. In this process, when necessary, a suitable polymerization initiator, or a suitable molecular weight adjusting agent or chain transfer agent may be used together.

The pressure-sensitive adhesive composition may further include a thiol compound. The thiol compound may be, for example, included in a pressure-sensitive adhesive composition as a separate component, included by being added and bonded to the acrylic polymer during the polymerization of the acrylic polymer, or included in a pressure-sensitive adhesive composition by being bonded to a different polymer, rather than the acrylic polymer.

As the thiol compound, for example, one or more compounds of the compounds represented by Formulas 2 to 5 below may be used.

In Formulas 2 to 5, $A^1$ to $A^3$ are each independently linear or branched alkylene, $R^1$ is a linear or branched alkyl group, $R^2$ is hydrogen, an alkyl group or -$A^4$-C(-$A^5$-O—C($=$O)-$A^6$-SH)$_n$R$_{(3-n)}$, wherein $A^4$ to $A^6$ are each independently linear or branched alkylene, R is a linear or branched alkyl group, and n is a number of 1 to 3.

For the thiol compound, in Formulas 2 to 5, $A^1$ may be linear or branched alkylene having 1 to 8 carbon atoms. Also, for the thiol compound, in Formulas 2 to 5, $R^1$ may be a linear or branched alkyl group having 3 to 20 carbon atoms. Also, for the thiol compound, in Formulas 2 to 5, $A^2$ may be a linear or branched alkyl group having 1 to 4 carbon atoms. For the thiol compound, in Formulas 2 to 5, $A^3$ is a linear or branched alkyl group having 1 to 4 carbon atoms, $R^2$ is hydrogen, a linear or branched alkyl group having 4 to 12 carbon atoms or -$A^4$-C(-$A^5$-O—C($=$O)-$A^6$-SH)$_n$R$_{(3-n)}$, wherein $A^4$ to $A^6$ are each independently a linear or branched alkyl group having 1 to 4 carbon atoms, and n is preferably 2 or 3.

In the definition of Formulas 2 to 5, the alkyl group or the alkylene group may be substituted by, for example, a thiol group, a hydroxyl group or a carboxyl group.

As the thiol compound, specifically, 2-mercapto ethanol, glycidyl mercaptan, mercaptoacetic acid, 2-ethylhexylthioglycolate, 2,3-dimercapto-1-propanol, n-dodecane thiol, t-butyl mercaptan, n-butyl mercaptan, 1-octadecane thiol, trimethylol propane tris(3-mercapto thiol) and/or pentaerythritol tetrakis(3-mercapto propionate) may be used.

The thiol compound may be included at 0.001 to 3 parts by weight with respect to 100 parts by weight of the the compound of Formula 1 of an acrylic polymer. Therefore, physical properties of the pressure-sensitive adhesive layer, for example, an initial adhesive strength, durability and a peel strength may be effectively maintained.

The pressure-sensitive adhesive composition may further include a multifunctional crosslinking agent having a functional group capable of reacting with a crosslinkable functional group in the acrylic polymer.

The term "multifunctional crosslinking agent" used herein may refer to a bifunctional or higher functional compound, which has two or more functional groups capable of reacting a crosslinkable functional group of the acrylic polymer in one molecule, for example, a multifunctional compound having 2 to 6 functional groups in one molecule. The two or more functional groups included in one molecule may be the same as or different from each other.

In the present application, as the multifunctional crosslinking agent, a compound including one or more functional groups such as a carboxyl group, an acid anhydride group, a vinyl ether group, an amine group, a carbonyl group, an isocyanate group, an epoxy group, an aziridinyl group, a carbodiimide group or an oxazoline group as the functional group capable of reacting with the crosslinkable functional group.

In one example, the multifunctional crosslinking agent having a carboxyl group may be, for example, an aromatic dicarboxylic acid such as o-phthalic acid, isophthalic acid, terephthalic acid, 1,4-dimethylterephthalic acid, 1,3-dimethylisophthalic acid, 5-sulfo-1,3-dimethylisophthalic acid, 4,4-biphenyldicarboxylic acid, 1,4-naphthalenedicarboxylic acid, 2,6-naphthalenedicarboxylic acid, norbornenedicarboxylic acid, diphenylmethane-4,4'-dicarboxylic acid or phenylindane dicarboxylic acid; an aromatic dicarboxylic acid anhydride such as anhydrous phthalic acid, 1,8-naphthalenedicarboxylic acid anhydride or 2,3-naphthalenedicarboxylic acid anhydride; an alicyclic dicarboxylic acid such as hexahydrophthalic acid; an alicyclic dicarboxylic anhydride such as hexahydrophthalic anhydride, 3-methyl-hexahydrophthalic anhydride, 4-methyl-hexahydrophthalic anhydride or 1,2-cyclohexanedicarboxylic anhydride; or an aliphatic dicarboxylic acid such as oxalic acid, malonic acid, succinic acid, adipic acid, sebacic acid, azelaic acid, suberic acid, maleic acid, chloromaleic acid, fumaric acid, dodecanoic acid, pimellic acid, citraconic acid, glutaric acid or itaconic acid.

In one example, the multifunctional crosslinking agent having an acid anhydride group may be pyromellitic anhydride, benzophenonetetracarboxylic acid dianhydride, biphenyltetracarboxylic acid dianhydride, oxydiphthalic acid dianhydride, dipheylsulfonetetracarboxylic acid dianhydride, diphenylsulfidetetracarboxylic acid dianhydride, butanetetracarboxylic acid dianhydride, perylenetetracarboxylic acid dianhydride, or naphthalenetetracarboxylic acid dianhydride.

In one example, the multifunctional crosslinking agent having a vinyl ether group may be ethyleneglycoldivinylether, diethyleneglycoldivinylether, triethyleneglycoldivinylether, tetraethyleneglycoldivinylether, pentaerythritoldivinylether, propyleneglycoldivinylether, dipropyleneglycoldivinylether, tripropyleneglycoldivinylether, neopentylglycoldivinylether, 1,4-butanedioldivinylether, 1,6-hexanedioldivinylether, glycerindivinylether, trimethylolpropanedivinylether, 1,4-dihydroxycyclohexanedivinylether, 1,4-dihydroxymethylcyclohexanedivinylether, hydroquinonedivinylether, ethyleneoxide modified hydroquinonedivinylether, ethyleneoxide modified resorcinoldivinylether, ethyleneoxide modified bisphenol A divinylether, ethyleneoxide modified bisphenol S divinylether, glycerintrivinylether, sorbitoltetravinylether, trimethylolpropanetrivinylether, pentaerythritoltrivinylether, pentaerythritoltetravinylether, dipentaerythritolhexavinylether, dipentaerythritolpolyvinylether, ditrimethylolpropanetetravinylether, or ditrimethylolpropanepolyvinylether.

In one example, the multifunctional crosslinking agent having an amine group may be an aliphatic diamine such as ethylenediamine or hexamethylenediamine; an alicyclic diamine such as 4,4'-diamino-3,3'-dimethyldicyclohexylmethane, 4,4'-diamino-3,3'-dimethyldicyclohexyl, diaminocyclohexane or isophoronediamine; or an aromatic diamine such as xylenediamine.

In one example, the multifunctional crosslinking agent having an isocyanate group may be an aromatic polyisocyanate such as 1,3-phenylenediisocyanate, 4,4'-diphenyldiisocyanate, 1,4-phenylenediisocyanate, 4,4'-diphenylmethanediisocyanate, 2,4-tolylenediisocyanate, 2,6-tolylenediisocyanate, 4,4'-toluidinedi isocyanate, 2,4,6-triisocyanatetoluene, 1,3,5-triisocyanatebenzene, dianisidinediisocyanate, 4,4'-diphenyletherdiisocyanate, 4,4',4"-triphenylmethane triisocyanate, toluene diisocyanate, xylene diisocyanate or xylylenediisocyanate; an aliphatic polyisocyanate such as trimethylenediisocyanate, tetramethylenediisocyanate, hexamethylenediisocyanate, pentamethylenediisocyanate 1,2-propylenediisocyanate, 2,3-butylenediisocyanate, 1,3-butalenediisocyanate, dodecamethylenediisocyanate, or 2,4,4-trimethylhexamethylenediisocyanate; an aromatic polyisocyanate such as ω,ω'-diisocyanate-1,3-dimethylbenzene, ω,ω'-diisocyanate-1,4-dimethylbenzene, ω,ω'-diisocyanate-1,4-diethylbenzene, 1,4-tetramethylxylylenediisocyanate, 1,3-tetramethylxylenediisocyanate; an alicyclic polyisocyanate such as 3-isocyanatemethyl-3,5,5-trimethylcyclohexylisocyanate, 1,3-cyclopentanediisocyanate, 1,3-cyclohexanediisocyanate, 1,4-cyclohexanediisocyanate, methyl-2,4-cyclohexanediisocyanate, methyl-2,6-cyclohexanediisocyanate, 4,4'-methylenebis(cyclohexylisocyanate) or 1,4-bis(isocyanatemethyl)cyclohexane, or a reaction product of at least one of the above-described polyisocyanates and a polyol. A specific type of the multifunctional crosslinking agent may be determined by a type of a crosslinkable functional group included in the acrylic polymer.

The pressure-sensitive adhesive composition may include a multifunctional crosslinking agent at 0.01 to 10 parts by weight or 0.1 to 5 parts by weight with respect to 100 parts by weight of the acrylic polymer, and in such a range, a suitable cohesive force of the pressure-sensitive adhesive layer may be ensured.

In addition to the above-described components, the pressure-sensitive adhesive composition may further include a conventional additive such as a silane coupling agent, a tackifier, an epoxy resin, a UV stabilizer, an antioxidant, a coloring agent, a reinforcing agent, a filler, a foaming agent, a surfactant or a plasticizer, when necessary.

In addition, the pressure-sensitive adhesive composition of the present application may form a pressure-sensitive adhesive•adhesive layer which has a temporal pressure-sensitive adhesive strength as a pressure-sensitive•adhesive when attached, and has a permanent adhesive strength to a base layer after going through a crosslinking process. As an example, the pressure-sensitive adhesive composition may be a urethane or epoxy pressure-sensitive adhesive•adhesive composition.

A pressure-sensitive adhesive layer of the conductive film of the present application may be formed by forming a layer of a pressure-sensitive adhesive composition by applying the pressure-sensitive adhesive composition to one or both sides of the intermediate base layer, and crosslinking the layer of the pressure-sensitive adhesive composition.

As described above, the crosslinking may be performed before, after or while a conductive base layer is attached. A method of crosslinking the pressure-sensitive adhesive composition may be performed by maintaining the layer of the pressure-sensitive adhesive composition at a predetermined temperature to react the above-described acrylic polymer with the multifunctional crosslinking agent, but the present application is not particularly limited thereto. In another example, when the pressure-sensitive adhesive composition includes a component reacted by irradiation with an active energy ray as a crosslinking component, the crosslinking may be performed by irradiating the pressure-sensitive adhesive component with suitable active energy rays, for example, UV rays, to induce the reaction of the component.

Before, after or during the crosslinking of the layer of the pressure-sensitive adhesive composition, the conductive base layer may be attached thereto. As shown in FIGS. 1 and 3, a conductive base layer 13 may include a base layer 13a and a conductive layer 13b formed on one side of the base layer, and a layer of a pressure-sensitive adhesive composition 12a or a pressure-sensitive adhesive layer 12b may be attached to the other side of the base layer on which the conductive layer 13b is not formed.

The conductive base layer may be manufactured by forming the conductive layer on one side of the base layer. A type of the base layer on which the conductive layer is formed is not particularly limited, and a suitable material may be selected from, for example, the materials used in formation of the above-described intermediate base layer. The thickness of the base layer is not particularly limited, and may be suitably determined. Conventionally, the base layer may have a thickness of approximately 3 to 300 μm, approximately 5 to 250 μm, or approximately 10 to 200 μm.

The conductive layer may be formed by a method of forming a thin film, for example, vacuum deposition, sputtering, ion plating, spray pyrolysis, chemical plating, electroplating or a combination of at least two thereof, and conventionally, vacuum deposition or sputtering.

As a material for a conductive layer, a metal such as gold, silver, platinum, palladium, copper, aluminum, nickel, chromium, titanium, iron, cobalt, tin or an alloy of at least two thereof; a metal oxide such as indium oxide, tin oxide, titanium oxide, cadmium oxide or a mixture of at least two thereof; or another metal oxide consisting of copper iodide may be used. The conductive layer may be a crystal layer or an amorphous layer. Conventionally, the conductive layer may be formed using indium tin oxide (no), but the present application is not limited thereto. The thickness of the conductive layer may be adjusted to approximately 10 to 300 nm, and preferably, approximately 10 to 200 nm depending on probability of forming a continuous layer, a conductive property, and transparency.

The conductive layer may be formed on the base layer by means of an anchor layer or a dielectric layer. That is, the conductive base layer may have a structure in which the base layer, the anchor layer or the dielectric layer, and the conductive layer are sequentially formed. Such an anchor layer or dielectric layer may enhance a cohesive property between the conductive layer and the base layer, and improve scratch resistance or folding endurance. The anchor layer or dielectric layer may be formed of, for example, an inorganic material such as $SiO_2$, $MgF_2$ or $Al_2O_3$; an organic material such as an acrylic resin, a urethane resin, a melamine resin, an alkyd resin or a siloxane-based polymer; or a mixture of at least two thereof, and as a forming method thereof, for example, vacuum deposition, sputtering, ion plating or a coating method may be employed. The anchor layer or dielectric layer may be formed to conventionally have approximately 100 nm or less, 15 to 100 nm, or 20 to 60 nm.

Also, a suitable adhesive treatment such as corona discharging, irradiation with UV rays, plasma treatment or sputter etching may be performed on one or both sides of the base layer of the conductive base layer. Also, a conventional surface treatment layer such as a hard coating layer or a blocking prevention layer may be formed on one or both sides of the base layer of the conductive base layer.

A method of attaching the conductive base layer to the intermediate base layer is not particularly limited, and may be formed by a conventional method.

After the conductive base layer is attached, any conventional process may be additionally carried out. As a representative process, a crystallization process which is performed when the conductive layer of the conductive base layer is non-crystalline or semi-crystalline state may be used.

Such a crystalline process may be conventionally performed at a high temperature, for example, approximately 100 to 300° C. A crystallization time may be adjusted to accomplish crystallization in a required level, and the time is conventionally approximately 10 minutes to 12 hours. Specific conditions for the crystallization process or types of other processes that can be performed, rather than the crystallization process are not particularly limited, and those that are conventionally performed in the process of manufacturing the conductive film may be applied.

The layer of the pressure-sensitive adhesive composition formed on one or both sides of the intermediate base layer of the present application may be formed by stacking a film-type layer including the pressure-sensitive adhesive composition on the intermediate base layer, rather than directly applying the above-described pressure-sensitive adhesive composition to the intermediate base layer.

As a specific example, the above-described pressure-sensitive adhesive composition may be applied to an arbitrary support, dried and cured to form a layer, and then detached, thereby forming a film-type layer of an uncrosslinked adhesive composition, and the layer of the pressure-sensitive adhesive composition may be stacked on the intermediate base layer, thereby forming the layer of the pressure-sensitive adhesive composition on the intermediate base layer.

After the layer of the pressure-sensitive adhesive composition is formed by the above-described method, the layer of the pressure-sensitive adhesive composition may be crosslinked, and thereby a pressure-sensitive adhesive layer may be formed. That is, the method of manufacturing the conductive film of the present application may include attaching the conductive base layer to the intermediate base layer by means of the layer of the uncrosslinked pressure-sensitive adhesive composition formed on one or both sides of the intermediate base layer, and crosslinking the pressure-sensitive adhesive composition while the conductive base layer is attached, and even with the conductive film manufactured by the above-described method, the above-described excellent peeling property may be obtained.

Also, the present application may provide a conductive film formed by thermal treatment of an intermediate base layer having a layer of a pressure-sensitive adhesive composition on one or both sides thereof, and attaching a conductive base layer to the intermediate base layer by means of the layer of the pressure-sensitive adhesive composition, thereby preventing bubbling, and having an excellent peel strength to the intermediate base layer of the conductive base layer.

In other words, as a conductive base layer is attached after a thermal treatment for maintaining an intermediate base layer having the layer of the pressure-sensitive adhesive composition on one or both sides thereof at a predetermined temperature, the excellent peeling property to the intermediate base layer of the conductive base layer and the effect of preventing bubbling, which are described above, may be obtained.

Figure 5:
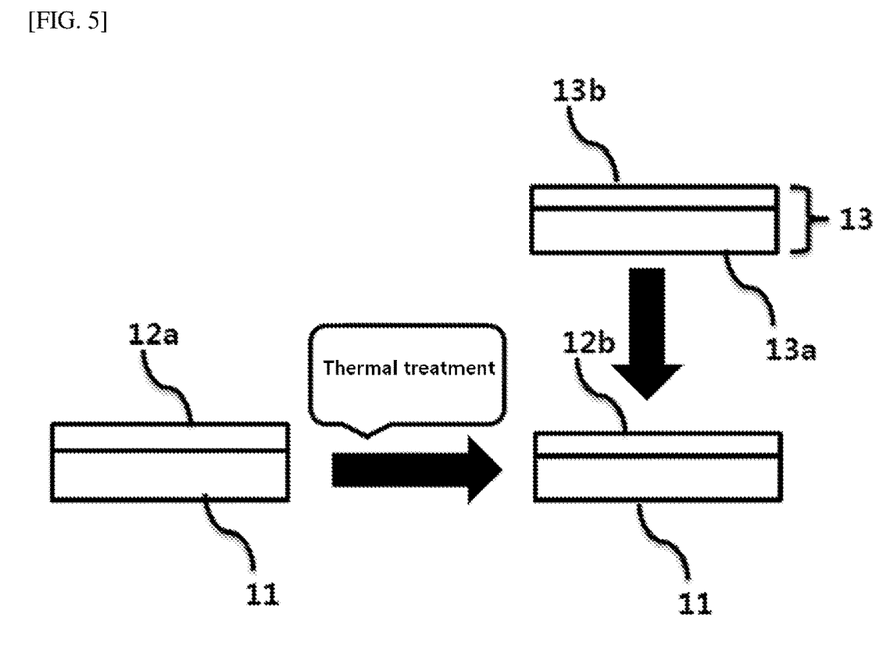
FIGS. 5 and 6 are schematic diagrams illustrating a thermal treatment for crosslinking a layer of a pressure-sensitive adhesive composition.
Figure 6:
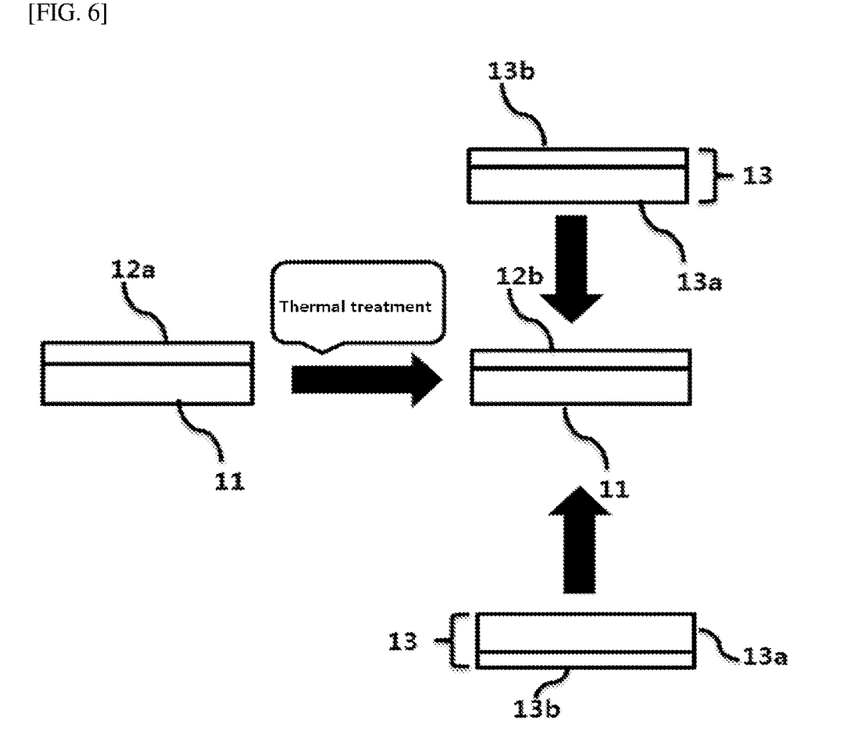

Through the thermal treatment, crosslinking may be performed by a reaction of the above-described acrylic polymer with a multifunctional crosslinking agent. Accordingly, the thermal treatment may be performed in the method of maintaining the intermediate base layer having the layer of the pressure-sensitive adhesive composition at a temperature at which the acrylic polymer and the multifunctional crosslinking agent can be crosslinked. As an example, as illustrated in FIGS. 5 and 6, a pressure-sensitive adhesive layer 12b may be formed by inducing crosslinking on the layer of the pressure-sensitive adhesive composition through an thermal treatment for maintaining an intermediate base layer 11 having a layer of a pressure-sensitive adhesive composition 12a on one or both sides thereof at 50 to 200° C., and the thermal treatment may be performed before a conductive base layer 13 is attached. That is, the method of manufacturing the conductive film may include maintaining the intermediate base layer having the layer of the pressure-sensitive adhesive composition at 50 to 200° C., and attaching the intermediate base layer to the conductive base layer.

In one example, the thermal treatment may be performed by two stages. For example, the thermal treatment may include a first process in which the intermediate base layer is maintained at approximately 100 to 200° C. or 110 to 180° C. and a second process in which the intermediate base layer at 40 to 100° C. or 50 to 90° C. The terms "first" and "second" used herein are used to distinguish between two stages, and the order of the processes is not limited by these terms. That is, the thermal treatment may be performed in the order of the first process to the second process, and vice versa. For example, the process may be performed in the order of the first process to the second process. The time for each process is not particularly limited as long as it is adjusted for a conductive base layer that will be attached later to have the above-described peel strength and to be attached to the intermediate base layer.

The thermal treatment may be performed when the conductive base layer is attached to the intermediate base layer by means of the layer of the pressure-sensitive adhesive composition. The process of forming a pressure-sensitive adhesive layer by inducing crosslinking on the layer of the pressure-sensitive adhesive composition through thermal treatment when the conductive base layer is attached to the intermediate base layer may include the above-described first and second processes.

The present application may relate to a conductive film manufactured by the above manufacturing method. That is, the present application may relate to the conductive film including an intermediate base layer; and a conductive base layer attached to one or both sides of the intermediate base layer to have a room temperature peel strength of 1,000 gf/inch or more, the room temperature peel strength is measured at a peeling rate of 0.3 m/min and a peeling angle of 180 degrees.

The intermediate base layer of the conductive film may include all of the descriptions of the intermediate base layer employed in the method of manufacturing the conductive film.

The conductive base layer of the present application may be attached to the intermediate base layer by means of a pressure-sensitive adhesive layer or an adhesive layer. The conductive base layer may be attached to one side of the intermediate base layer as illustrated in FIG. 1, or attached to both sides of the intermediate base layer as illustrated in FIG. 2.

As an example, the conductive film may be manufactured by attaching the conductive base layer having a room temperature peel strength of 1,000 gf/inch or more with respect to the intermediate base layer to the both sides of the intermediate base layer, wherein the room temperature peel strength is measured at a peeling rate of 0.3 m/min and a peeling angle of 180 degrees.

The conductive base layer may be attached before or after the layer of the pressure-sensitive adhesive composition formed by directly applying or laminating the pressure-sensitive adhesive composition to the intermediate base layer is crosslinked, thereby obtaining a high peel strength with respect to the intermediate base layer, and as an example, the room temperature peel strength with respect to the intermediate base layer measured at a peeling rate of 0.3 m/min and a peeling angle of 180 degrees may be 1,000 to 5,000 gf/inch or 1,000 to 10,000 gf/inch.

The pressure-sensitive adhesive layer of the conductive film of the present application refers to a layer in the state in which the layer of the pressure-sensitive adhesive composition has been crosslinked, and all of the descriptions for the pressure-sensitive adhesive composition mentioned in the method of manufacturing the conductive film may be included without limitation.

That is, the pressure-sensitive adhesive layer may include at least one selected from the group consisting of an acrylic pressure-sensitive adhesive, a silicone pressure-sensitive adhesive, a rubber pressure-sensitive adhesive and a polyester pressure-sensitive adhesive, and the acrylic pressure-sensitive adhesive may include at least one selected from the group consisting of ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl(meth)acrylate, isobornyl (meth)acrylate, and lauryl (meth)acrylate.

Also, the pressure-sensitive adhesive layer of the present application may be a layer of a pressure-sensitive adhesive•adhesive, which has a temporal pressure-sensitive adhesive strength as a pressure-sensitive adhesive when attached, but can have a permanent adhesive strength to the base layer through a crosslinking process. As an example, the pressure-sensitive adhesive•adhesive layer may be a urethane or epoxy pressure-sensitive adhesive•adhesive layer, but the present application is not limited thereto. A process of forming the pressure-sensitive adhesive•adhesive layer is known, and may be the same as the above-described process of forming the pressure-sensitive adhesive layer.

The present application may relate to a use of the conductive film. The conductive film may be used in, for example, a display device such as an organic light emitting diode (OLED), a plasma display panel (PDP) or a liquid crystal display (LCD), or a touch panel, and the conductive film of the present application may be applied to all of the conventional uses of the conductive film.

Hereinafter, examples of a conductive film, a use of the conductive film and a method of manufacturing the conductive film will be described, but the following examples are only examples according to the present application, not limit the technical spirit of the present application. Physical properties represented in examples and comparative examples were evaluated by the method that will be described below.

1. Method of evaluating peel strength
(1) Measuring tool: TA-XT2plus
(2) Mode: tension mode
(3) Trigger force: 5 gf
(4) Peeling rate: 0.3 m/min
(5) Peeling angle: 180 degrees
(6) Specimen size: width 12 cm×length 2.54 cm Example 1

A pressure-sensitive adhesive composition was prepared by mixing a mixture solution including 94 parts by weight of butyl acrylate (BA) and 6 parts by weight of acrylic acid (AA) with 1 part by weight of a toluene diisocyanate crosslinking agent with respect to 100 parts by weight of the mixture solution. A pressure-sensitive adhesive layer was formed by directly applying the pressure-sensitive adhesive composition to both sides of a polyethyleneterephthalate base layer, and dividing the polyethyleneterephthalate to which the pressure-sensitive adhesive composition was applied into four sections and then drying the polyethyleneterephthalate at 80 to 140° C. in an oven. A double-side conductive film was manufactured by attaching a conductive base layer by means of the pressure-sensitive adhesive layer formed on both sides of the polyethyleneterephthalate. A peel strength of the double-side conductive film is as shown in Table 1 below. Also, the double-side conductive film was aged at 40° C. and 60° C., and then bubbling was detected by day, which is shown in Table 2 below. Here, a thermal treatment for a conductive layer was performed at 190° C. for 15 minutes.

Example 2

A pressure-sensitive adhesive composition was prepared by mixing a mixture solution including 94 parts by weight of butyl acrylate (BA) and 6 parts by weight of acrylic acid (AA) with 1 part by weight of a toluene diisocyanate crosslinking agent with respect to 100 parts by weight of the mixture solution, and the double-side conductive film was manufactured by the same method as described in Example 1. Peel strengths of the double-side conductive film and detection results for bubbling are shown in Tables 1 and 2 below.

Example 3

A pressure-sensitive adhesive composition prepared by mixing a mixture solution including 50 parts by weight of 2-ethylhexyl acrylate, 40 parts by weight of methyl acrylate and 10 parts by weight of 2-hydroxyethyl acrylate with 0.25 parts by weight of an isocyanate crosslinking agent with respect to 100 parts by weight of the mixture solution was directly applied to both sides of a polyethyleneterephthalate base layer, and then a conductive film was manufactured by the same method as described in Example 1. Peel strengths of the double-side conductive film and detection results for bubbling are shown in Tables 1 and 2 below.

Example 4

A film-type layer of a pressure-sensitive adhesive composition was formed by applying a pressure-sensitive adhesive composition prepared by mixing a mixture solution including 94 parts by weight of butyl acrylate (BA) and 6 parts by weight of acrylic acid (AA) with 1 part by weight of a toluene diisocyanate crosslinking agent with respect to 100 parts by weight of the mixture solution to a support and drying the resulting layer, and then detached. A non-carrier film (NCF) was manufactured by attaching release films to both sides of the detached layer of the pressure-sensitive adhesive composition. The release film attached to one side of the NCF was removed, laminated on both sides of a polyethyleneterephthalate base layer, and then thermally pre-treated at 150° C. for 30 minutes in an oven. Afterward, the release film attached to the other side of the NCF was removed, and then a conductive base layer was attached thereto. Peel strengths of the double-side conductive film and detection results for bubbling are shown in Tables 1 and 2 below.

Example 5

The double-side conductive film was manufactured by the same method as described in Example 4, except that an NCF manufactured using a pressure-sensitive adhesive composition prepared by mixing a mixture solution including 50 parts by weight of 2-ethylhexyl acrylate, 40 parts by weight of methyl acrylate and 10 parts by weight of 2-hydroxyethyl acrylate with 0.25 parts by weight of an isocyanate crosslinking agent with respect to 100 parts by weight of the mixture solution. Peel strengths of the double-side conductive film and detection results for bubbling are shown in Tables 1 and 2 below.

Comparative Example

A film-type layer of a pressure-sensitive adhesive composition was formed by applying a pressure-sensitive adhesive composition prepared by mixing a mixture solution including 50 parts by weight of 2-ethylhexyl acrylate, 40 parts by weight of methyl acrylate and 10 parts by weight of 2-hydroxyethyl acrylate with 0.2 parts by weight of a xylene diisocyanate crosslinking agent with respect to 100 parts by weight of the mixture solution and drying the resulting composition, and then detached. An NCF was manufactured by attaching release films to both sides of the detached layer of the pressure-sensitive adhesive composition. The release film attached to one side of the NCF was removed and laminated on both sides of a polyethyleneterephthalate base layer, and the release film attached to the other side of the NCF was removed, and then a conductive base layer was attached. Peel strengths of the double-side conductive film and detection results for bubbling are shown in Tables 1 and 2 below.

TABLE 1

|  | Peel strength (gf/inch) |
| --- | --- |
| Example 1 | 1147 |
| Example 2 | 1032 |
| Example 3 | 1449 |
| Example 4 | 1011 |
| Example 5 | 1243 |
| Comparative Example | 822 |

TABLE 2

| | | Conductive thermal treatment performed under conditions including 190° C., 15 minutes | | | | | |
|---|---|---|---|---|---|---|---|
| | | Day 1 | | Day 2 | | Day 3 | |
| | | bubbles | microbubbles | bubbles | microbubbles | bubbles | microbubbles |
| Example 1 | 40° C. aging | Δ | Δ | X | X | X | X |
| | 60° C. aging | Δ | X | X | X | X | X |
| Example 2 | 40° C. aging | Δ | Δ | X | X | X | X |
| | 60° C. aging | Δ | X | X | X | X | X |
| Example 3 | 40° C. aging | Δ | Δ | X | X | X | X |
| | 60° C. aging | Δ | X | X | X | X | X |
| Example 4 | 40° C. aging | Δ | Δ | Δ | X | X | X |
| | 60° C. aging | Δ | X | X | X | X | X |
| Example 5 | 40° C. aging | Δ | Δ | Δ | X | X | X |
| | 60° C. aging | Δ | X | X | X | X | X |
| Comparative Example | 40° C. aging | ○ | ○ | ○ | ○ | ○ | ○ |
| | 60° C. aging | ○ | ○ | ○ | ○ | ○ | ○ |

○: A large quantity of bubbles are generated.
Δ: A small amount of bubbles are generated.
X: No bubbles are generated.

The invention claimed is:

1. A method of manufacturing a double-sided conductive film, wherein the double-sided conductive film comprises an intermediate base layer consisting of a plastic film; and two conductive base layers attached to both sides of the intermediate base layer, the method comprising:
thermally treating the intermediate base layer by maintaining the intermediate base layer on both sides of which layers of an uncrosslinked pressure-sensitive adhesive composition are formed, at 50 to 200° C., wherein each of the layers of the uncrosslinked pressure-sensitive adhesive composition is directly formed on a surface of the intermediate base layer,
then attaching the conductive base layers to the both sides of the intermediate base layer to have a room temperature peel strength of 1,000 gf/inch or more with respect to the intermediate base layer, wherein the room temperature peel strength is measured at a peeling rate of 0.3 m/min and a peeling angle of 180 degrees,
wherein each of the conductive base layers includes a conductive layer and a base layer, wherein the conductive layer is formed on one side of the base layer and the base layer is attached to the intermediate base layer, and
wherein the base layer of each of the conductive base layers is a plastic film.

2. The method of claim 1, wherein the layers of the uncrosslinked pressure-sensitive adhesive composition are crosslinked while the conductive base layers are attached to the both sides of the intermediate base layer.

3. The method of claim 1, wherein the layers of the uncrosslinked pressure-sensitive adhesive composition are additionally crosslinked before or after the conductive base layers are attached to the both sides of the intermediate base layer.

4. The method of claim 1, wherein a process for maintaining the intermediate base layer at 50 to 200° C. includes a first process for maintaining the intermediate base layer at 100 to 200° C. and a second process for maintaining the intermediate base layer at 50 to 90° C.

5. The method of claim 4, wherein the first process and the second process are sequentially performed.

6. The method of claim 1, wherein the conductive layer of each of the conductive base layers is additionally crystallized after each of the conductive base layers is attached.

7. The method of claim 6, wherein the crystallization is performed by performing thermal treatment at 100 to 300° C.

* * * * *